United States Patent
Kurita et al.

[11] Patent Number: 6,049,968
[45] Date of Patent: Apr. 18, 2000

[54] METHOD FOR PRODUCING FLOATING TYPE OF MAGNETIC HEAD USED IN A MAGNETIC RECORDING APPARATUS

[75] Inventors: Kazuyuki Kurita; Shigeyuki Adachi, both of Shizuoka-ken, Japan

[73] Assignee: Minebea Co., Ltd., Kitasaku-gun, Japan

[21] Appl. No.: 09/138,898

[22] Filed: Jan. 30, 1998

Related U.S. Application Data

[62] Division of application No. 08/824,341, Mar. 26, 1997, Pat. No. 5,771,134.

[30] Foreign Application Priority Data

Apr. 12, 1996 [JP] Japan ................................. 8-115456

[51] Int. Cl.[7] ................................................. G11B 5/127
[52] U.S. Cl. ................................. 29/603.12; 29/603.16; 360/103
[58] Field of Search ........................... 29/603.12, 603.46, 29/407, 603.08, 603.01; 360/103, 125, 126, 127, 104, 122, 129, 102, 123

[56] References Cited

U.S. PATENT DOCUMENTS

| | | | |
|---|---|---|---|
| 5,065,500 | 11/1991 | Yoneda et al. | 29/603 |
| 5,297,330 | 3/1994 | Matsuzawa et al. | 29/603 |
| 5,657,185 | 8/1997 | Adachi et al. | 360/103 |
| 5,885,131 | 3/1999 | Azarian et al. | 451/5 |

FOREIGN PATENT DOCUMENTS 6-76224  3/1994  Japan.

*Primary Examiner*—Lee Young
*Assistant Examiner*—Binh-An Nguyen
*Attorney, Agent, or Firm*—Oliff & Berridge, PLC

[57] ABSTRACT

A floating type of magnetic head having a high mechanical strength and a superior productivity and a method for producing the same are provided. A slider is composed of a first slider body and a second slider body. A main cut groove and a second sub-cut grooves are formed on a bonded surface side of the first slider body so that a first pillar portion and a second pillar portion around which lead lines are to be wound together with a first core body and a second core body a magnetic head core are left. Since the first and second pillar portions are bonded to the second slider body and during the assembling and machining operations, the first and second pillar portions receive a force that is applied to the slider or the magnetic head core to be effective for the reinforcement of the mechanical strength, the slider or the magnetic head may hardly be damaged or broken down. It is possible to facilitate the manufacturing steps in comparison with the case where a reinforcement portion is formed to bridge over a groove for winding a lead line in a single slider. Accordingly, it is possible to enhance the productivity.

1 Claim, 6 Drawing Sheets

METHOD FOR PRODUCING FLOATING TYPE OF MAGNETIC HEAD USED IN A MAGNETIC RECORDING APPARATUS

This is a Division of Application Ser. No. 08/824,341 filed Mar. 26, 1997 now U.S. Pat. No. 7,771,134. The entire disclosure of the prior application is hereby incorporated by reference herein in its entirety.

BACKGROUND OF THE INVENTION

1. Field of the Invention

The present invention relates to a floating type of magnetic head used in a magnetic recording apparatus such as a magnetic disc apparatus and a method for producing the same.

2. Description of the Related Art

FIG. 8 shows an example of a conventional floating type of magnetic head.

In FIG. 8, the conventional head 1 is composed of a rectangular slider 2, a magnetic head core 3 for read/write and coils 4.

The slider 2 is provided with a first and second projecting rails 6 and 7 extending in a longitudinal direction on one surface thereof (hereinafter referred to as an air bearing surface) 5 so as to generate a floating force to a magnetic recording medium (not shown). A triangular recess 8 (as viewed in a plan view) (hereinafter referred to as a triangular recess) is formed at a corner portion of one end side T of the first rail 6 in the slider 2 (hereinafter referred to as a trailing side) to thereby secure a space for winding lead lines 9.

The magnetic head core 3 is formed substantially into an annular shape by abutting ends of a pair of first and second C core members 10 and 11 with each other. A read/write gap 12 is formed on an air bearing surface side of the magnetic head core 3. The magnetic head core 3 is bonded to the triangular recess in such a way as the gap 12 is arranged to face the air bearing surface, the magnetic head core 3 is bonded to a side surface portion 2a of the slider 2. In this case, the first core member 10 of the magnetic head core 3 is located on the trailing side T of the first rail 6.

The coils 4 are wound around the core members 10 and 11 for causing the read/write function to the gap 12. These coils 4 are formed by winding lead lines 9 through the triangular recess 8 around the core members 10 and 11.

By the way, recently, a floating type of magnetic head has become smaller in size. In accordance with this tendency, also in the above-described floating type of magnetic head 1, a ratio of the occupation of the triangular recess 8 used for winding space for the lead lines 9 is increased, so that the mechanical strength of the slider 2, what is more, the overall system becomes small. For this reason, in the case where a mechanical force is applied to the system in assembling the floating type of magnetic head 1 and during the machining operation thereof, there is a problem that the slider 2 or the magnetic head core 3 would be damaged or liable to be subjected to the fracture.

In order to cope with this problem, there is provided a floating type of magnetic head 1 in which a reinforcement portion 13 is provided so as to bridge over the rectangular recess 8 in the slider 2 as shown in FIG. 9 (see Japanese Laid-Open Patent Application No. Hei 6-76224). In this floating type of magnetic head 1, the reinforcement portion 13 receives a mechanical force during the assembling and manufacturing the floating type of magnetic head 1, so that the slider 2 or the magnetic head core 3 would hardly be damaged or broken down.

However, in the floating type of magnetic head 1 shown in FIG. 9, since the slider 2 is structured so that the reinforcement portion 13 bridges over the triangular recess 8, the productivity thereof is inferior, and as a matter of fact, this countermeasure is not appropriate. Incidentally, there are methods for machining the slider 2 by using a laser beam, an ultrasonic cutter or an ion etching. However, any of these methods did not hold good in view of productivity. In addition, these methods require a large scale equipment for realizing, therefore, they are not appropriate countermeasure for the above-noted defects.

SUMMARY OF THE INVENTION

In order to overcome the above-noted defects, an object of the present invention is to provide a floating type of magnetic head having a high mechanical strength and a superior productivity and a method for manufacturing the same.

According to the present invention, there is provided a floating type of magnetic head in which a magnetic head core for read/write is bonded to a side wall of a slider in which rails are provided for generating a floating force above a magnetic recording medium, characterized in that the slider is composed of a first and second slider bodies which are made of non-magnetic ceramics, and grooves are formed so that the lead lines may be wound therethrough, wherein a pillar portion around which lead lines are to be wound together with at least one leg portion of the magnetic head core is left on either of the bonded surface of the first or second slider bodies.

According to the present invention, there is provided a method for producing a floating type of magnetic head in which a magnetic head core for read/write is bonded to a side wall of a slider in which rails are provided for generating a floating force above a magnetic recording medium, characterized by comprising the following steps of:

forming the slider made of non-magnetic ceramics by bonding slider base members of a thick plate and a thin plate;

forming a plurality of grooves on the bonded surface of a thick slider base member in a matrix manner, in which a plurality of pillar portions around which lead lines are to be wound together with at least one leg portion of the magnetic head core are formed;

obtaining a slider bonding assembly by bonding the thin plate slider base member onto the bonded surface of the thick plate slider base member together;

forming the rails on the slider bonding assembly; and cutting the slider bonding assembly for every pillar portion to obtain the slider.

DESCRIPTION OF THE PREFERRED EMBODIMENTS

Figure 8:
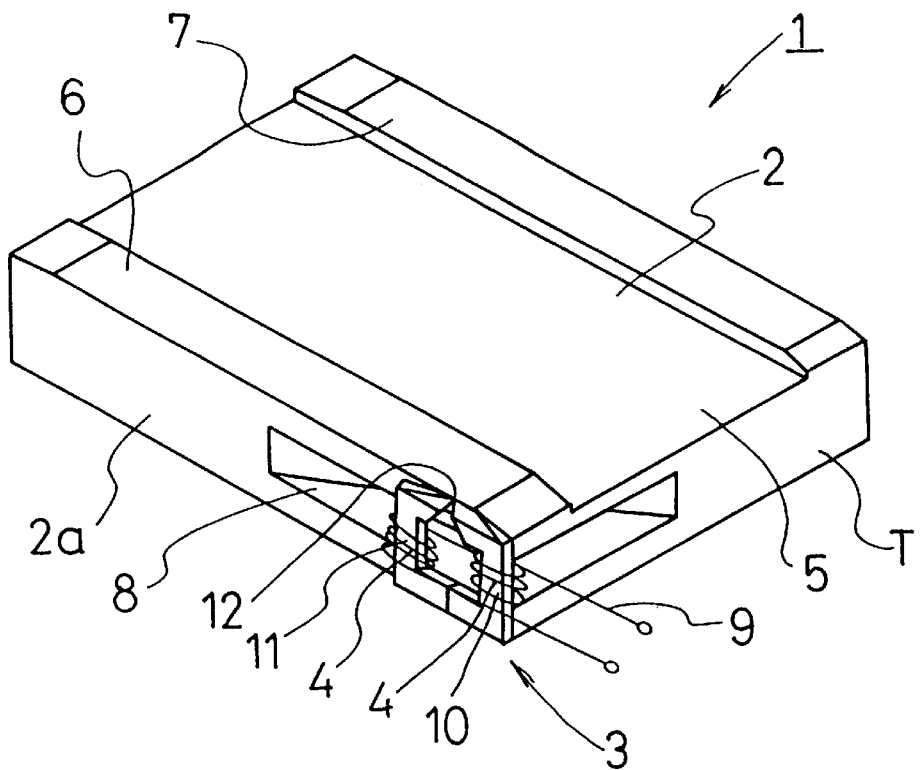
FIG. 8 is a perspective view showing an example of a conventional floating type of magnetic head.
Figure 9:
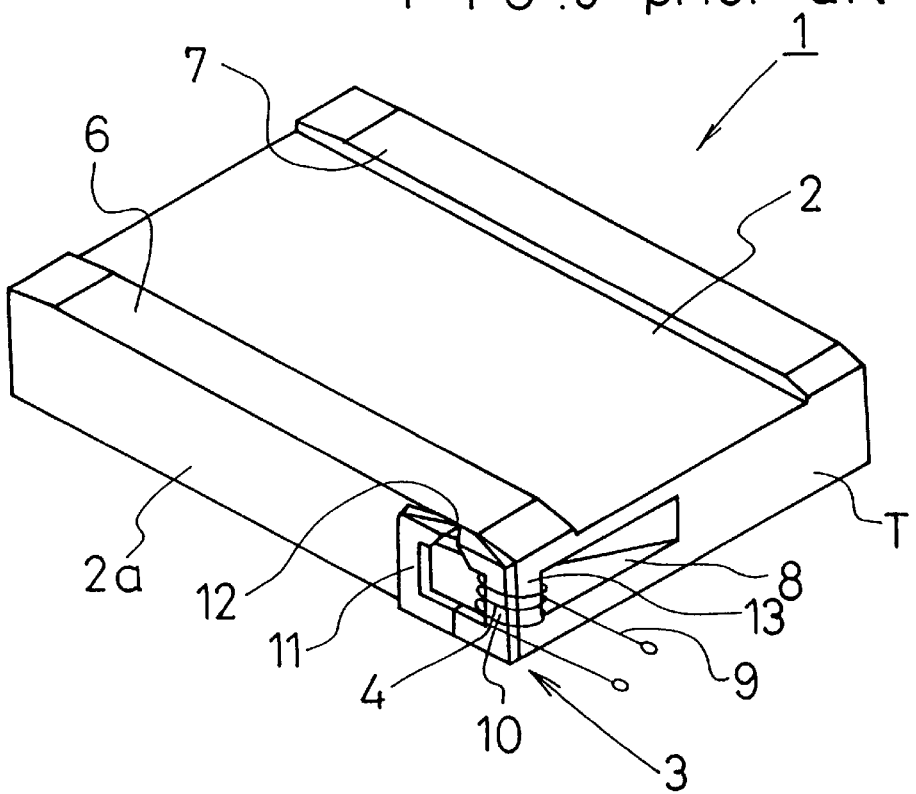
FIG. 9 is a perspective view showing another example of a conventional floating type of magnetic head.

A floating type of magnetic head and a method for producing the same in accordance with one embodiment of the invention will now be described with reference to FIGS. 1 through 4. In the following description and accompanying drawings, the indication and description will be omitted appropriately the same members and components as shown in FIGS. 8 and 9 for the sake of avoiding the duplication.

Figure 1:
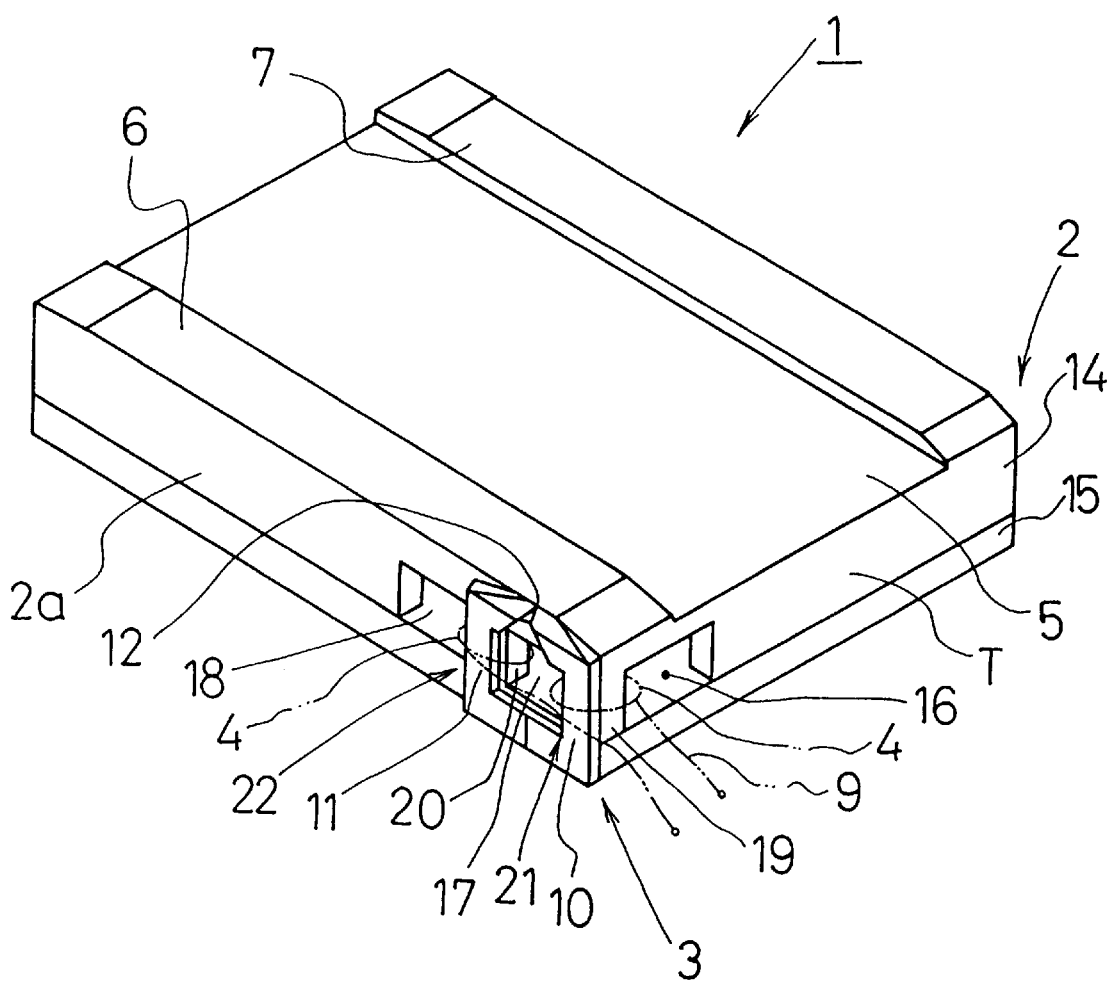
FIG. 1 is a perspective view showing a floating type of magnetic head according to one embodiment of the invention.

In FIG. 1, the floating type of magnetic head 1 is composed of a rectangular slider 2, a read/write magnetic head core 3 and coils 4.

The slider 2 is composed of a first and second slider bodies 14 and 15 which are made of non-magnetic ceramic and are to be bonded with each other. The slider bodies 14 and 15 are rectangular shape and made of a thick plate and a thin plate, respectively.

A first and second projecting rails 6 and 7 which extend in the longitudinal direction are formed on a non-bonded surface 5 of the first slider body 14 so that a floating force is generated above a magnetic recording medium (not shown).

Figure 4:
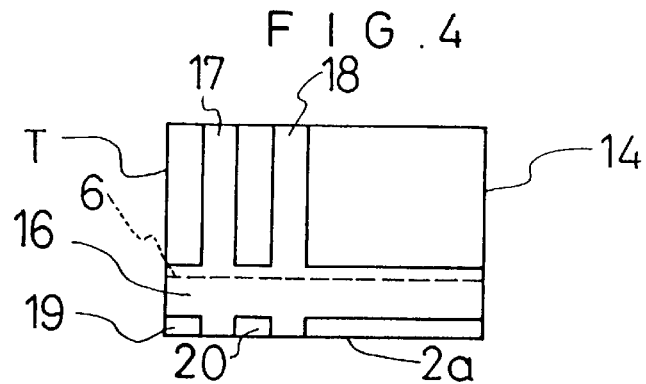
FIG. 4 is a bottom view showing grooves formed in the slider.

A single main cut groove 16 is formed along the first rail 6 on the bonded surface of the first slider body 14 as shown in FIG. 4. First and second sub-cut grooves 17 and 18 which are perpendicular to the main cut groove 16 are formed on the trailing side T on the bonded surface of the first slider body 14 so that a winding space for the lead lines 9 of the coil may be secured together with the main cut groove 16.

The main cut groove 16 and the sub-cut grooves 17 and 18 are formed, so that first and second pillar portions 19 and 20 are left in the first slider body 14.

The second slider body 15 is bonded to the bonding surface of the first slider body 14 to thereby form the slider 2.

The magnetic head core 3 is formed into an annular shape by abutting ends of core members 10 and 11 which are C-shaped. A read/write gap 12 is formed on the air bearing surface side of the magnetic head core 3. The magnetic head core 3 is bonded to a side wall portion 2a of the slider 2 in such a manner as the first and second core members 10 and 11 are bonded so as to be overlapped with the first and second pillar portions 19 and 20, respectively.

The coils 4 are wound around an overlapped assembly 21 formed of the first core member 10 and the first pillar portion 19 and an overlapped assembly 22 formed of the second core member 11 and the second pillar portion 20, respectively, in a balance winding manner for causing the read/write function to the gap 12, thereby suppressing the adverse affect of the external magnetic field. The coils 4 are formed by winding the lead lines 9 around the overlapped assemblies 21 and 22 through the main cut groove 16 and the sub-cut grooves 17 and 18.

The method for manufacturing the above-described floating type of magnetic head 1 will now be described on the basis of FIGS. 2 and 3.

Figure 2:
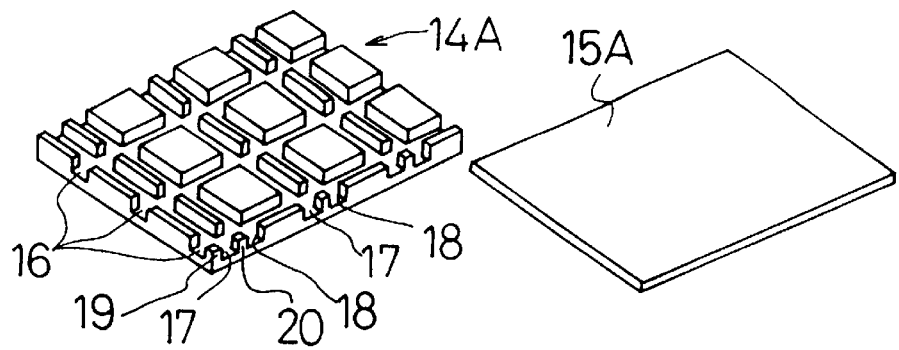
FIGS. 2(1) to 2(6) are views showing steps of a manufacturing method of the floating type of magnetic head.
Figure 2:
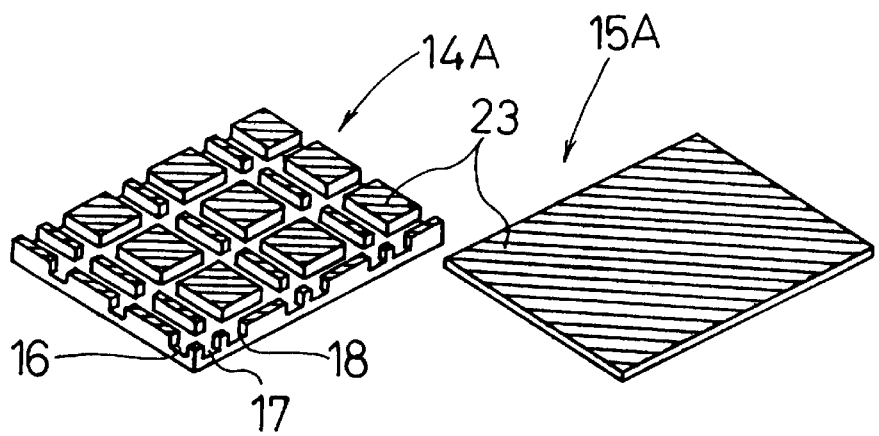
Figure 2:
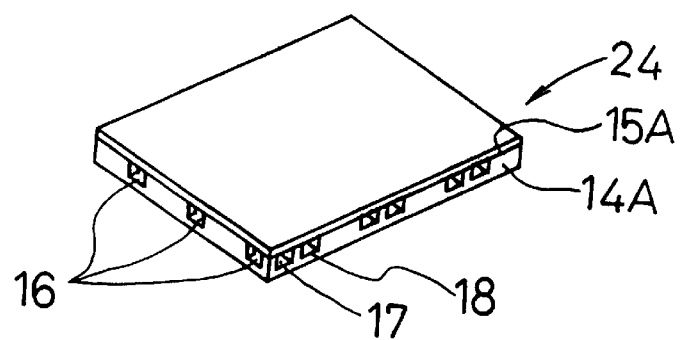
Figure 2:
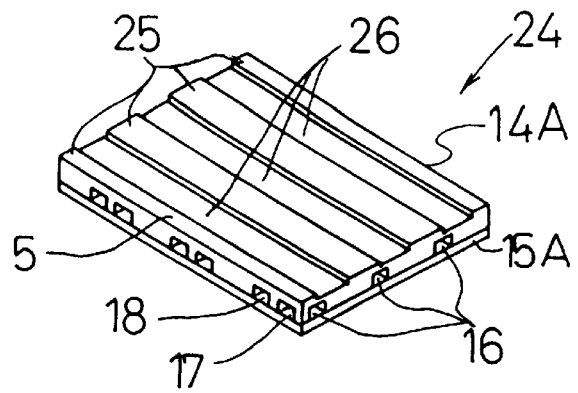
Figure 2:
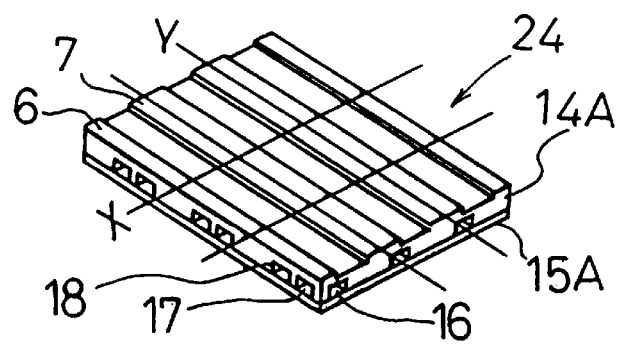
Figure 2:
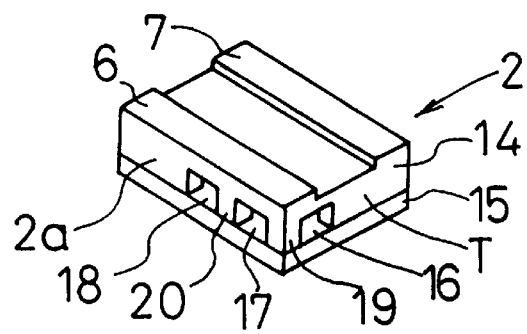
Figure 3:
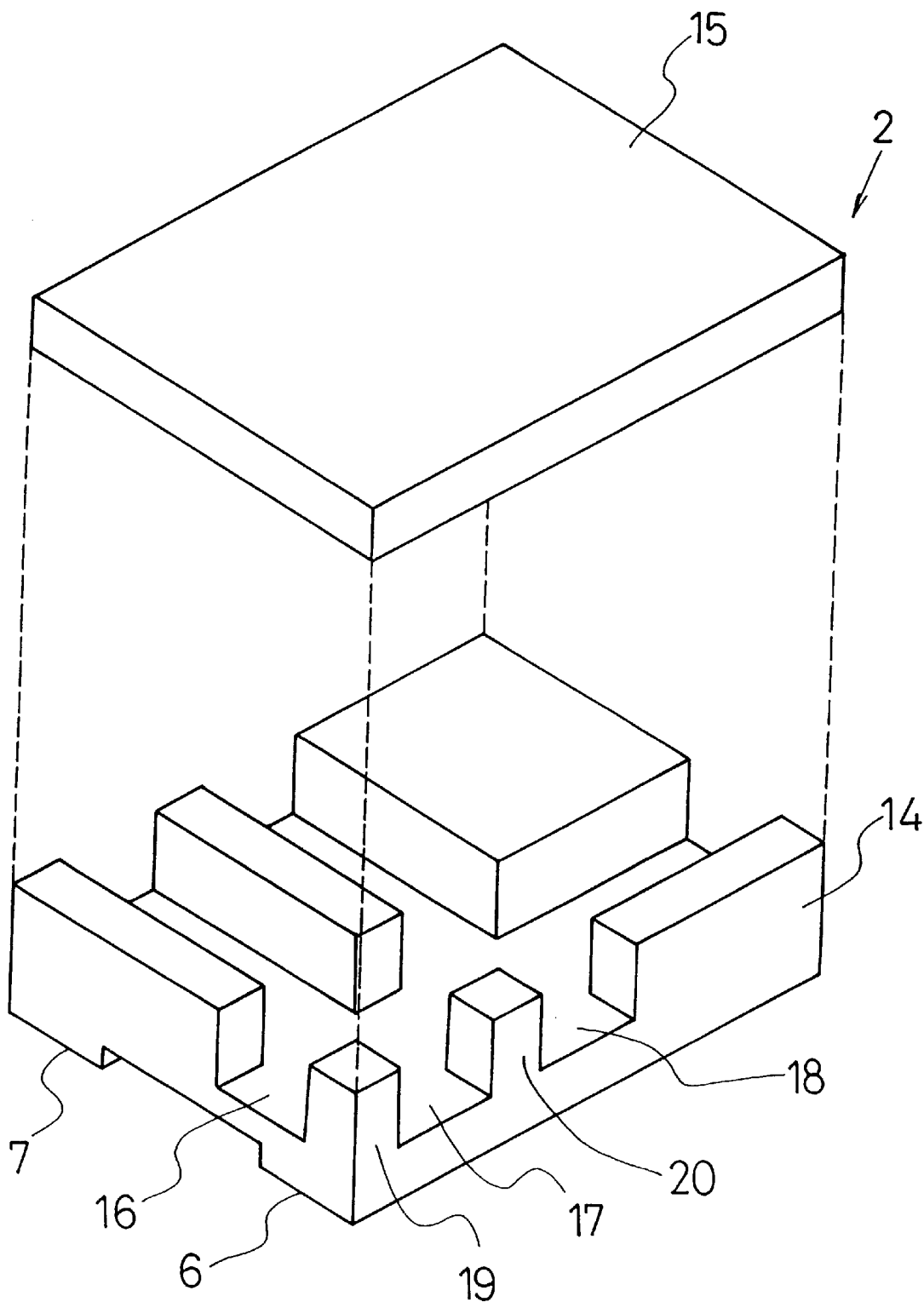
FIG. 3 is an exploded perspective view showing the slider of the floating type of magnetic head.

In FIG. 2, reference characters 14A and 15A denote first and second slider base members to be made into the first and second slider bodies 14 and 15, which are made of non-magnetic ceramics and are made of thick and thin plates, respectively. First of all, in step (1), a plurality of main cut grooves 16 are formed in parallel with each other on one surface side (on the bonded surface side) of the first slider base member 14a, and at the same time, a plurality of pairs of sub-cut grooves 17 and 18 are formed perpendicular to the main cutgrooves 16.

By the fact that the plurality of main cut grooves 16 and the plurality of pairs of sub-cut grooves 17 and 18 are formed, and by effecting the cutting operation in step (5) to be described later, a plurality of pairs of pillar portions 19 and 20 are left in a matrix on the bonded surface side of the first slider base member 14A.

In next step (2), the polishing is applied to the bonded surface sides of the first and second slider base members 14A and 15A until these surfaces obtain a mirror surface condition. Then, glass films 23 are sputtered thereon.

In subsequent step (3), the first and second slider base members 14A and 15A onto which the glass films 23 have been sputtered are abutted with each other. Then, the thermal bonding is applied thereto, i.e., by the glass bonding, both of the members are bonded together to obtain the slider bonding member 24. Incidentally, the method for bonding the first and second slider base members 14A and 15A together is not limited to the bonding method through the glass described hereinabove. It is possible to use other methods therefor. For instance, a method may be applied in such a way as the first and second slider base members 14A and 15A are abutted with each other and the thermal bonding treatment is effected thereto in the vicinity of the softening temperature of each material, and intermaterial bonding is applied thereto, so that these members 14A and 15A are bonded.

Subsequently, in step (4), a plurality of grooves 26 are formed on the non-bonded surface (the air bearing surface 5) side of the first slider base member 14A for constituting the slider bonding member 24 so that the rail projecting portions 25, which are to be made into the first and second rails 6 and 7 are left. Incidentally, in the embodiment, the grooves 26 are formed on the non-bonded surface side of the first slider base member 14A. However, it is possible to form the grooves 26 on the non-bonded surface of the second slider base member 15A so that the non-bonded surface side of the second base member 15A may become the air bearing surface.

In next step (5), the slider bonding member 24 is cut in directions X and Y so as to include the first and second paired pillar portions 19 and 20. As a result, a plurality of sliders 2 (see step (6)) each of which is composed of the first and second slider bodies 14 and 15 may be obtained. The exploded perspective view of the slider 2 regarding this case shown in FIG. 3. Incidentally, in the case where a dimension in the directions X and Y of the slider 2 is not a predetermined dimension when the slider bonding member 24 is cut in the directions X and Y, it is possible to effect a machining operation thereto so as to obtain the predetermined dimension in the directions X and Y of the slider 2 after the cutting operation, if necessary.

In next step (6), a thin film made of a low temperature glass is formed by a sputtering method on the bonding surface of the magnetic head core 3 and the side wall portion 2a of the slider 2 to thereby bond these two components.

Thereafter, as shown in FIG. 1, the coils 4 are formed by winding the lead lines 9 around the overlapped assembly 21 composed of the first core member 10 of the magnetic head core 3 and the first pillar portion 19 and the overlapped assembly 22 composed of the second core member 11 of the magnetic head core 3 and the second pillar portion 20, respectively, by passing the lead lines 9 through the main cut groove 16 and the first and second sub-cut grooves 17 and 18 to thereby obtain the floating type of magnetic head 1.

As described above, in the thus constructed floating type of magnetic head 1, since the first and second pillar portions 19 and 20 are bonded to the second slider body 15, and the force that is applied to the slider 2 or the magnetic head core 3 during the assembling and manufacturing operations is received by the first and second pillar portions 19 and 20 to attain the reinforcement function, even if the main cut groove 16 and the first and second sub-cut grooves 17 and 18 are provided for the purpose of winding the lead lines 9 and forming the coils 4 therearound, the mechanical strength of the slider 2 or the magnetic head core 3 is not degraded, as a result of which, the slider 2 or the magnetic head core 3 would hardly be damaged or broken down. As described above, the first and second pillar portions 19 and 20 are provided in order to increase the mechanical strength of the slider 2. Due to the above structure, it is possible to avoid the deformation of the slider 2 and to cope with any phenomenon like the floating amount is reduced without fail.

Also, the foregoing steps in which the main cut groove 16 and the first and second sub-cut grooves 17 and 18 are formed on the bonded surface side of the first slider body 14, the first and second pillar portions 19 and 20 are left and the first and second pillar portions 19 and 20 are bonded to the second slider body 15 to thereby enhance the mechanical strength may realize the facilitation of manufacture and the enhancement of the productivity incomparison with the case where the reinforcement portion 13 bridges recess the triangular recess 8 in the one-body slider 2 as shown in FIG. 9.

Furthermore, as described above, since the slider 2 is obtained by cutting the slider bonding member 24 for every paired first and second pillar portions 19 and 20, it is possible to manufacture a number of sliders 2 at once. This obviously leads to the improvement in productivity.

In the above-described floating type of magnetic head 1 (Japanese Laid-Open Application No. Hei 6-76224) shown in FIG. 9, since the reinforcement portion 13 bridges over the recess for winding the coil (i.e., rectangular recess 8) in the slider 2, there is required a step for forming the reinforcement portion 13, besides, it is impossible to manufacture a plurality sliders 2 at once as described above, resulting in a low productivity. In contrast to this, according to a method of the present invention, as described above, since the formation of the main cut groove 16 and the sub-cut grooves 17 and 18 for the formation of the coils 4 in the slider 2 may readily be attained, the productivity thereof is enhanced correspondingly. Also, the plurality of sliders 2 may be produced at once whereby its productivity is further enhanced advantageously.

Figure 5:
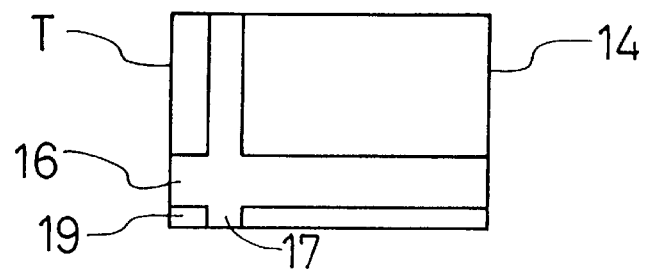
FIG. 5 is a bottom view showing the slider having grooves different in shape from those shown in FIG. 4.

In the foregoing embodiment, there is described that two of the first and second sub-cut grooves 17 and 18 are formed perpendicular to the main cut groove 16 on the trailing side T on the bonded surface of the first slider body 14, and the first and second pillar portions 19 and 20 are left in the first slider body 14. Instead thereof, as shown in FIG. 5, a single first sub-cut groove 17 may be formed in the first slider body 14, in which only the first pillar portion 19 is left in the first slider body 14.

Figure 6:
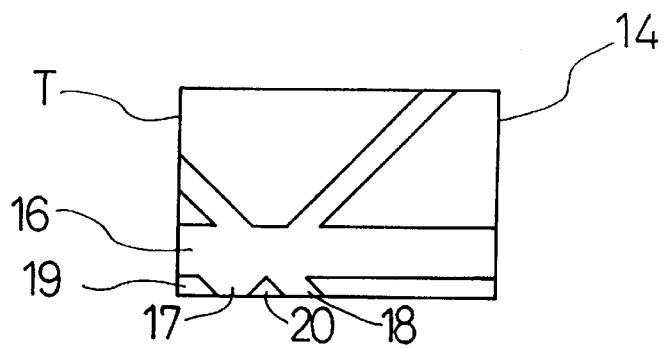
FIG. 6 is a bottom view showing the slider having grooves different in shape from those shown in FIG. 5.

Also, in the foregoing embodiment, there is described two of the first and second sub-cut grooves 17 and 18 are formed perpendicular to the main cut groove 16. Instead thereof, for instance, as shown in FIG. 6, the two grooves 17 and 18 may be formed in such a manner as the two grooves 17 and 18 intersect the groove 16 at a certain angle thereto. Similarly, as to forming single first sub-cut groove 17 as shown in FIG. 5, the above described may be applied to.

Figure 7:
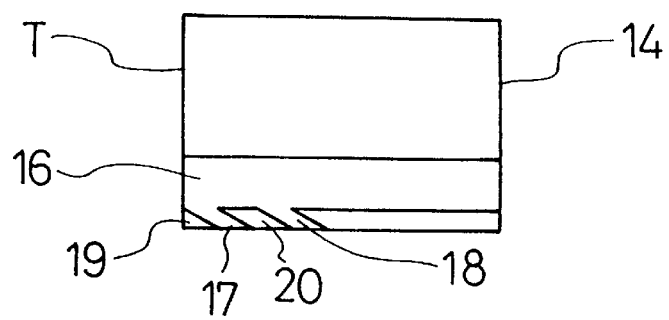
FIG. 7 is a bottom view showing the slider having grooves different in shape from those shown in FIG. 6.

Also, instead of the case where the first and second sub-cut grooves 17 and 18 intersect so as to penetrate perpendicularly to the main cut groove 16, for instance, as shown in FIG. 7, the grooves 17 and 18 may be formed so as not to penetrate the main cut groove 16, and the first and second pillar portions 19 and 20 are left in the first slider body 14. Also, the above described may be applied to the case where the single sub-cut groove is formed so that only one pillar portion is left.

According to the present invention, the pillar portions are bonded to the other slider body and received the force that is applied to the slider or the magnetic head core during the assembling and machining operations to attain the reinforcement function. Accordingly, even if the grooves which are required for forming the lead lines into the coils are provided, the slider or the magnetic head core may hardly be damaged or broken down. As described above, the pillar portions are provided to increase the mechanical strength of the slider, whereby it is possible to suppress the deformation of the slider. According to the above, it is possible to cope with any phenomenon without fail in the case where the floating mount would be reduced.

Also, the manufacturing steps for forming the groove on the bonded surface of the slider bodies while the pillar portions are to be bonded to the other slider body, enables the manufacture of the slider to be done more easily in comparison with the case where the reinforcement portion is provided to bridge over the groove for winding the lead lines therethrough in the single slider.

Furthermore, as described above, since the slider bonding member is cut for every pillar portion to obtain the sliders, it is possible to manufacture a large number of the sliders at once. This contributes to the enhancement of the productivity.

What we claim is:

1. A method for producing a floating type of magnetic head having a magnetic head core for read/write bonded to a side wall of a slider, wherein rails are provided (for generating) that generate a floating force to a magnetic recording medium, the method comprising the steps of:

forming a plurality of grooves on one surface side of a thick slider base member made of non-magnetic ceramics while leaving at least one leg portion of the magnetic head core and a plurality of pillar portions around which lead lines may be wound;

bonding a thin plate slider base member made of non-magnetic ceramics onto the thick plate slider base member to form a slider bonding assembly;

forming the rails on the slider bonding assembly; and cutting the slider bonding assembly for every pillar portion to obtain the slider.

* * * * *